(12) United States Patent
Yang et al.

(10) Patent No.: US 8,331,273 B2
(45) Date of Patent: Dec. 11, 2012

(54) COMMUNICATION METHODS EMPLOYED IN COMMUNICATION SYSTEM ASSOCIATED WITH PROGRAMMABLE COMMUNICATION PROTOCOLS, AND RELATED TRANSMITTING METHODS, RECEIVING METHODS AND COMMUNICATION DEVICE

(75) Inventors: Shun-Pin Yang, Chang-Hua (TW);
Ting-Che Tseng, Hsinchu (TW);
Chin-Yang Hsieh, Taipei (TW);
Wei-Lun Wan, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 227 days.

(21) Appl. No.: 12/722,548

(22) Filed: Mar. 12, 2010

(65) Prior Publication Data
US 2011/0051635 A1   Mar. 3, 2011

Related U.S. Application Data

(60) Provisional application No. 61/237,749, filed on Aug. 28, 2009.

(51) Int. Cl.
*H04B 7/00* (2006.01)
(52) U.S. Cl. .................................................... 370/310
(58) Field of Classification Search ........... 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 6,643,522 | B1 * | 11/2003 | Young | 455/552.1 |
| 7,324,831 | B2 * | 1/2008 | Haartsen | 455/552.1 |
| 7,599,448 | B2 * | 10/2009 | Ahmed et al. | 375/300 |
| 2004/0170120 | A1 * | 9/2004 | Reunamaki et al. | 370/204 |
| 2005/0201486 | A1 * | 9/2005 | Han et al. | 375/295 |
| 2006/0116091 | A1 * | 6/2006 | Hammes et al. | 455/132 |
| 2007/0183531 | A1 * | 8/2007 | Ahmed et al. | 375/297 |
| 2007/0198905 | A1 * | 8/2007 | Bhatt et al. | 714/801 |
| 2009/0135957 | A1 * | 5/2009 | Norris et al. | 375/330 |
| 2009/0180651 | A1 * | 7/2009 | Hilpisch et al. | 381/315 |
| 2009/0311971 | A1 * | 12/2009 | Kielb et al. | 455/74.1 |
| 2009/0311972 | A1 * | 12/2009 | Husted et al. | 455/76 |

* cited by examiner

*Primary Examiner* — Kwang B Yao
*Assistant Examiner* — Jung-Jen Liu
(74) *Attorney, Agent, or Firm* — Winston Hsu; Scott Margo

(57) ABSTRACT

A communication method employed in a wireless communication system including a first communication device and a second communication device is provided. The communication method includes: setting up a connection between the first and second communication devices; after the connection is set up, checking if both the first and second communication devices provide a symbol mapping function for converting a first modulation/demodulation to a second modulation/demodulation different from the first modulation/demodulation; and when both the first and second communication devices provide the symbol mapping function, using the second modulation/demodulation to replace the first modulation/demodulation so that each of the first and second communication devices communicates with each other by using the second modulation/demodulation.

17 Claims, 7 Drawing Sheets

COMMUNICATION METHODS EMPLOYED IN COMMUNICATION SYSTEM ASSOCIATED WITH PROGRAMMABLE COMMUNICATION PROTOCOLS, AND RELATED TRANSMITTING METHODS, RECEIVING METHODS AND COMMUNICATION DEVICE

CROSS REFERENCE TO RELATED APPLICATIONS

This application claims the priority of U.S. Provisional Application No. 61/237,749, filed Aug. 28, 2009, which is included herein by reference in its entirety.

BACKGROUND

The invention relates to a wireless communication scheme, and more particularly, to a wireless communication method and related communication device, transmitter and receiver for data/audio communication by using a programmable communication protocol to replace the standard one when certain conditions are detected.

Generally speaking, for a wireless communication device such as the Bluetooth communication device, the performance is usually limited by the used modulation/demodulation scheme. For example, the currently developed Bluetooth communication device, a low-cost orientation device, tends to use a simple and low cost modulation/demodulation scheme, but the simple and low cost modulation/demodulation scheme may merely reach a certain performance and fails to gain better performance. As a result, the existing prior art knowledge usually adds lots of fancy algorithms to squeeze a little performance gain if a much better performance is required. However, adding additional fancy algorithms to the simple and low cost modulation/demodulation scheme is not a sufficient solution for the low cost orientation device. Therefore, how to achieve the low cost requirement in company with a better performance is an important topic for designers.

SUMMARY

It is therefore one of the objectives of the present invention to provide communication methods employed in a wireless communication system and related communication devices, transmitters and receivers, for using a specifically defined communication protocol including, for example, higher order modulation/demodulation scheme, coding scheme, the same vendor/manufacturer information, or coherent signal reception, instead of a standard-defined communication protocol, to improve the performance and achieve low cost requirement under certain conditions.

According to an embodiment of the claimed invention, a communication method employed in a wireless communication system including a first communication device and a second communication device is disclosed. The communication method comprises: setting up a connection between the first and second communication devices; after the connection is set up, checking if both the first and second communication devices provide a symbol mapping function for converting the first signal modulation/demodulation to a second signal modulation/demodulation different from the first signal modulation/demodulation; and when both the first and second communication devices provide the symbol mapping function, using the second signal modulation/demodulation to replace the first signal modulation/demodulation so that each of the first and second communication devices communicates with each other by using the second signal modulation/demodulation.

According to another embodiment of the claimed invention, a communication method employed in a receiver of a Bluetooth communication system is disclosed. The communication method comprises: receiving a Bluetooth packet, including differential phase reference information, from a transmitter; obtaining absolute phase reference information according to the differential phase reference information, wherein the receiver and the transmitter belong to a same vendor; and performing a coherent signal reception by referring to the absolute phase reference information.

According to another embodiment of the claimed invention, a communication method employed in a Bluetooth communication system is further disclosed. The communication method comprises: inserting at least a pilot signal pattern, including absolute phase reference information for phase synchronization, into a Bluetooth packet; and transmitting the Bluetooth packet.

According to another embodiment of the claimed invention, a communication method employed in a Bluetooth communication system is provided. The communication method comprises: receiving a Bluetooth packet, including at least a pilot signal pattern carrying absolute phase reference information; and performing a coherent signal reception by referring to the absolute phase reference information.

According to an embodiment of the claimed invention, a first communication device employed in a wireless communication system for communicating with a second communication device is disclosed. The first communication device comprises a signal processing unit and a controlling unit. The signal processing unit is utilized for processing data content of a packet according to at least a first communication protocol or a second communication protocol different from the first communication protocol. The controlling unit is coupled to the signal processing unit and utilized for checking if the second communication device supports the second communication protocol after a connection between the first and second communication devices is set up. When the second communication device supports the second communication protocol, the controlling unit is utilized for commanding the signal processing unit to process the data content of the packet to be communicated to the second communication device by using the second communication protocol.

According to an embodiment of the claimed invention, a communication method employed in a wireless communication system including a first communication device and a second communication device is disclosed. The communication method comprises: setting up a connection between the first and second communication devices by using a first communication protocol; after the connection is set up, checking if both the first and second communication devices support a second communication protocol different from the first communication protocol; and when both the first and second communication devices support the second communication protocol, using the second communication protocol to communicate between the first and second communication devices.

One of the advantages of the claimed invention is that the performance of a communication device can be improved by using a higher order modulation/demodulation scheme. For example, the throughput, sensitivity and robustness can be improved with low cost. In addition, a communication device used as a receiver can perform coherent signal reception by referring to at least a pilot signal pattern inserted into a packet according to the second communication protocol.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
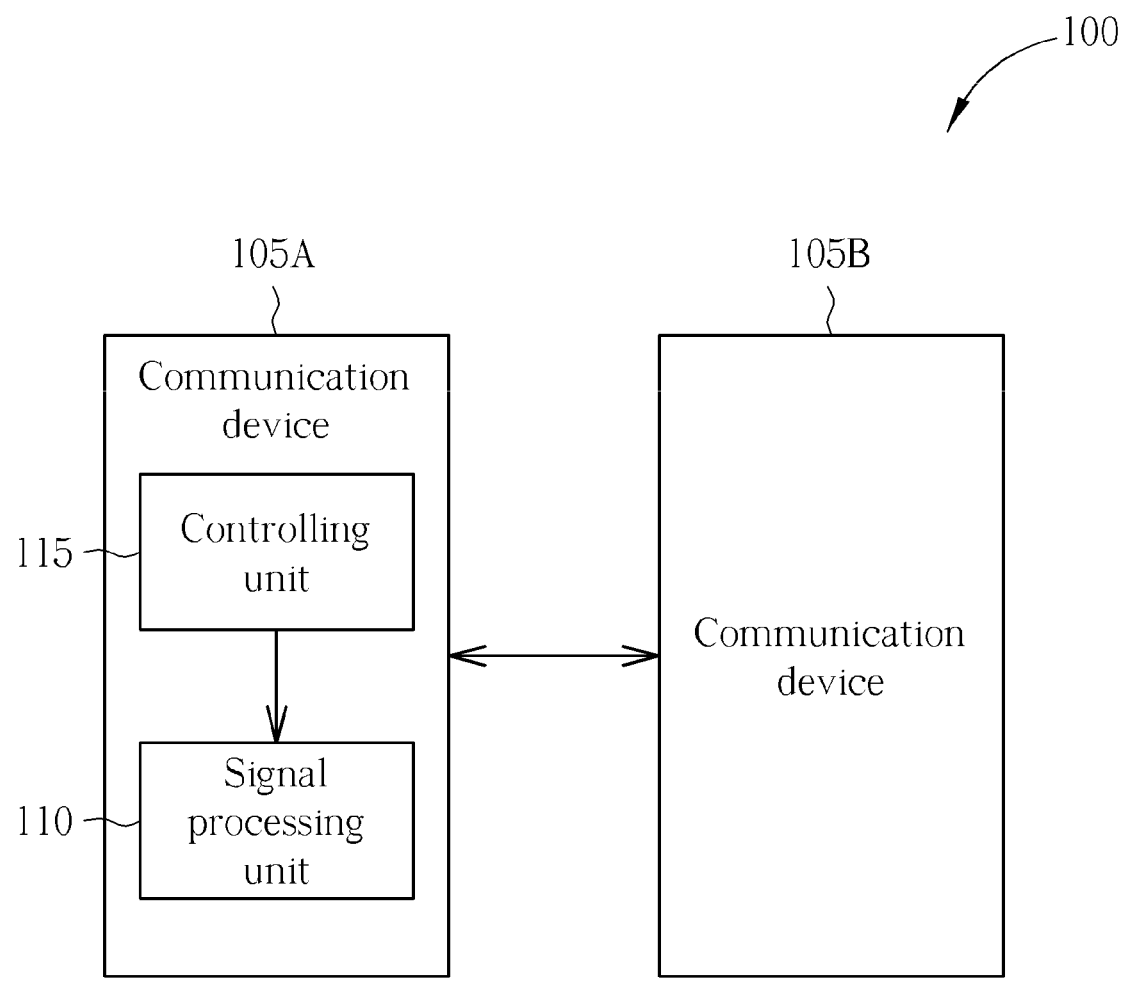
FIG. 1 is a diagram of a wireless communication system according to a first embodiment of the present invention.

Please refer to FIG. 1, which illustrates a wireless communication system 100 according to a first embodiment of the present invention. The wireless communication system 100, e.g. a Bluetooth system, includes at least two Bluetooth communication devices 105A and 105B, and each communication device can communicate with the other. The communication device 105A can be used as a Bluetooth transmitter or a Bluetooth receiver employed in the wireless communication system 100. That is, the communication device 105A may used as a transmitter for transmitting packets (including data or audio information) to the peer communication device 105B or it may be used as a receiver for receiving packets (including data or audio information) transmitted from the peer communication device 105B. Particularly, the communication device 105A comprises a signal processing unit 110 and a controlling unit 115. The signal processing unit 110 is used for processing data content of a packet, e.g. payload data of a Bluetooth packet, according to at least a first communication protocol and a second communication protocol. More specifically, the first communication protocol may be a standard protocol of the wireless communication system 100 defining a first modulation/demodulation scheme, a first coding/decoding scheme and a first packet format, and the second communication protocol may be a non-standard communication protocol of the wireless communication system 100 defining a second modulation/demodulation scheme different from the first modulation/demodulation scheme, a second coding/decoding scheme different from the first coding/decoding scheme, or a second packet format different from the first packet format. The controlling unit 115 is coupled to the signal processing unit 110 and used for checking if the peer communication device 105B supports the second communication protocol after a connection between the communication devices 105A and 105B is set up. Generally, the process of setting up the connection between the two communication devices 105A and 105B depends on the first communication protocol, which is a standard protocol that devices in the communication system 100 inherently conform with. When determining that the peer communication device 105B supports the second communication protocol, the controlling unit 115 commands the signal processing unit 110 to process the packets according to the second communication protocol under certain conditions, which will be explained in the following paragraphs.

In one embodiment, the second communication protocol provides a symbol mapping function for converting the first modulation/demodulation scheme to the second modulation/demodulation scheme. The first modulation/demodulation scheme herein relates to a Gaussian Frequency-Shift Keying (GFSK) modulation/demodulation for audio link (e.g. Synchronous Connection Oriented (SCO) link) when the communication system 100 is a Bluetooth system, and the second modulation/demodulation scheme, for example, is an M-ary Differential Phase-Shift Keying (MDPSK) modulation/demodulation, such as Binary Differential Phase-Shift Keying (BDPSK) modulation/demodulation, Differential Quadrature Phase Shift Keying (DQPSK), and Eight phase Differential Phase Shift Keying (8DPSK), for audio link of the Bluetooth system. That is, the MDPSK modulation/demodulation is utilized for processing payload data of a Bluetooth audio packet. However, this is not meant to be a limitation of the present invention. The MDPSK modulation/demodulation can be also employed for processing payload data of a Bluetooth data packet. In addition, in other examples, the second modulation/demodulation scheme mentioned above may be other signal modulation/demodulation scheme having a higher order (i.e. a higher number of different symbols used for transmission and reception) than that of the GFSK modulation/demodulation. For example, the second modulation/demodulation can be 16-QAM or 64-QAM modulation/demodulation scheme.

When determining that the peer communication device 105B provides/supports the symbol mapping function, the controlling unit 115 commands the signal processing unit 110 to use the second modulation/demodulation scheme to replace the first modulation/demodulation scheme, so that the signal processing unit 110 performs the second modulation/demodulation upon the data content of the packet and the communication device 105A can communicate with the communication device 105B by using the second modulation/demodulation. The peer communication device 105B is then informed by the communication device 105A that the second modulation/demodulation will be performed later a lapse of time. Thus, the communication device 105B will use the second modulation/demodulation in place of the first modulation/demodulation later. As a result, each of the communication devices 105A and 105B can communicate with the other via Bluetooth packets modulated/demodulated by the second modulation/demodulation having higher order than that of the GFSK modulation/demodulation. One of advantages of the modulation/demodulation having higher order is that the audio (synchronous connection oriented, SCO) link performance (including voice quality) can be improved significantly. For instance, the BDPSK modulation/demodulation can span signals in a region from zero degrees to plus 180 degrees while the GFSK modulation/demodulation merely spans signals in a region from minus 60 degrees to plus 60 degrees. This can improve the performance greatly.

Figure 2:
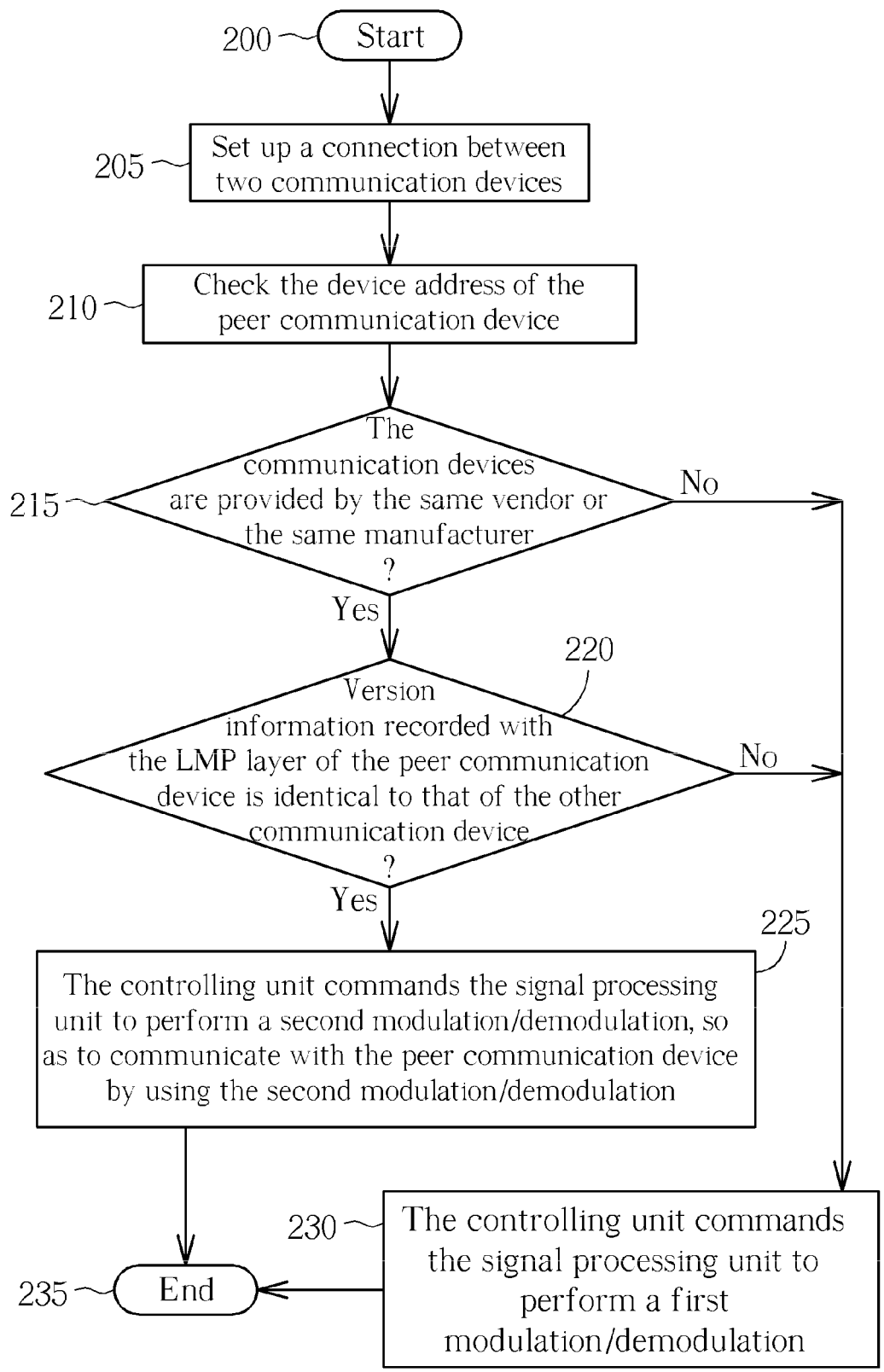
FIG. 2 is a flowchart illustrating the identification of the vendor information or manufacturer information.

In a special scenario of the first embodiment mentioned above, both the communication devices 105A and 105B are implemented or provided by the same vendor or manufacturer so that the communication devices 105A and 105B are configured to support the second communication protocol defined by the vendor or manufacturer. In other words, the vendor or manufacture embeds a self-defined communication protocol (the second communication protocol) into its chips or devices, and when a connection is linked between the devices and this special relationship (e.g. being produced by the same vendor/manufacture or being supportive of the self-defined communication protocol) is recognized, the devices may change to communicate with each other by using the self-defined communication protocol, so as to gain advantages of the self-defined communication protocol over the standard communication protocol. In this situation, the check is easy, and can be accomplished by merely checking vendor information or version information recorded within the link management protocol (LMP) layer of the peer communication device 105B. Please refer to FIG. 2, which is a flowchart illustrating the identification of the vendor information or manufacturer information. Provided that substantially the same result is achieved, the steps of the flowchart shown in FIG. 2 need not be in the exact order shown and need not be contiguous, that is, other steps can be intermediate. The description of the steps of the flowchart is described in the following:

Step 200: Start;

Step 205: The communication device 105A sets up a connection between the communication devices 105A and 105B, wherein the connection may support a synchronous connection-oriented transmission or an asynchronous connectionless transmission;

Step 210: The communication device 105A checks the device address (i.e. the MAC address) of the peer communication device 105B, wherein each communication device has its unique MAC address;

Step 215: The controlling unit 115 of the communication device 105A checks vendor/manufacturer information recorded within the LMP layer of the peer communication device 105B, to determine whether both the peer communication device 105B and the communication device 105A are provided by the same vendor or the same manufacturer (or belong to the same vendor/manufacturer); if the devices 105A and 105B correspond to the same vendor or the same manufacturer, this preliminarily means both the devices 105A and 105B provide the symbol mapping function and the flow then proceeds to the step 220; otherwise, the flow proceeds to the step 230;

Step 220: The controlling unit 115 determines whether version information recorded with the LMP layer of the peer communication device 105B is identical to that of the communication device 105A, to check if both the devices 105A and 105B provide/support the same LMP function; if both the LMP layers of the devices 105A and 105B have identical version information, once again this means both the devices 105A and 105B provide the symbol mapping function and the flow then proceeds to the step 225; otherwise, the flow proceeds to the step 230; and Step 225: The controlling unit 115 commands the signal processing unit 110 to perform the second modulation/demodulation, so as to communicate with the peer communication device 105B by using the second modulation/demodulation;

Step 230: The controlling unit 115 commands the signal processing unit 110 to perform the first modulation/demodulation; and Step 235: End.

Detail descriptions of some above-mentioned steps are explained as below. In Steps 205 and 210, the establishment of the connection between the communication devices 105A and 105B and the check of the MAC address of the peer communication device 105B can be accomplished according to the regular packet format of the Bluetooth system (i.e. the first communication protocol). Accordingly, the communication device 105A can still correctly communicate with the peer communication device 105B prior to using the second modulation/demodulation. In Step 215, the controlling unit 115 is arranged to determine if contents of a plurality of fields respectively corresponding to the LMP layers of the communication devices 105A and 105B are identical or not, wherein the above-mentioned fields are associated with vendor/manufacturer information. The LMP is utilized for controlling and negotiating all aspects of the operation of the connection between two Bluetooth communication devices. The LMP includes the set-up and control of logical transports and logical links, and is also used for control of physical links. Once the contents of the fields recorded within the LMP layers are identical, the controlling unit 115 can preliminarily determines that the peer communication device 105B provides/supports the symbol mapping function. Next, in Step 220, the controlling unit 115 determines if contents of a plurality of fields respectively corresponding to the LMP layers of the communication devices 105A and 105B are identical or not, wherein the fields herein are associated with version information, e.g. version numbers of the Bluetooth communication or version numbers of the subversions of respective the LMP layers. The subversion of an LMP layer relates to operations and functions of the LMP layer in a Bluetooth communication device. Thus, by confirming whether the subversion numbers of the respective LMP layers are identical or not, the controlling unit 115 can determine if the peer communication device 105B also provides the symbol mapping function further. It should be noted that checking both the vendor/manufacturer information and the version information is not necessary for determining if the peer communication device 105B provides the symbol mapping function. In another embodiment, the controlling unit 115 may merely check one of the vendor/manufacturer information and the version information. This also obeys the spirits of the present invention.

Figure 3:
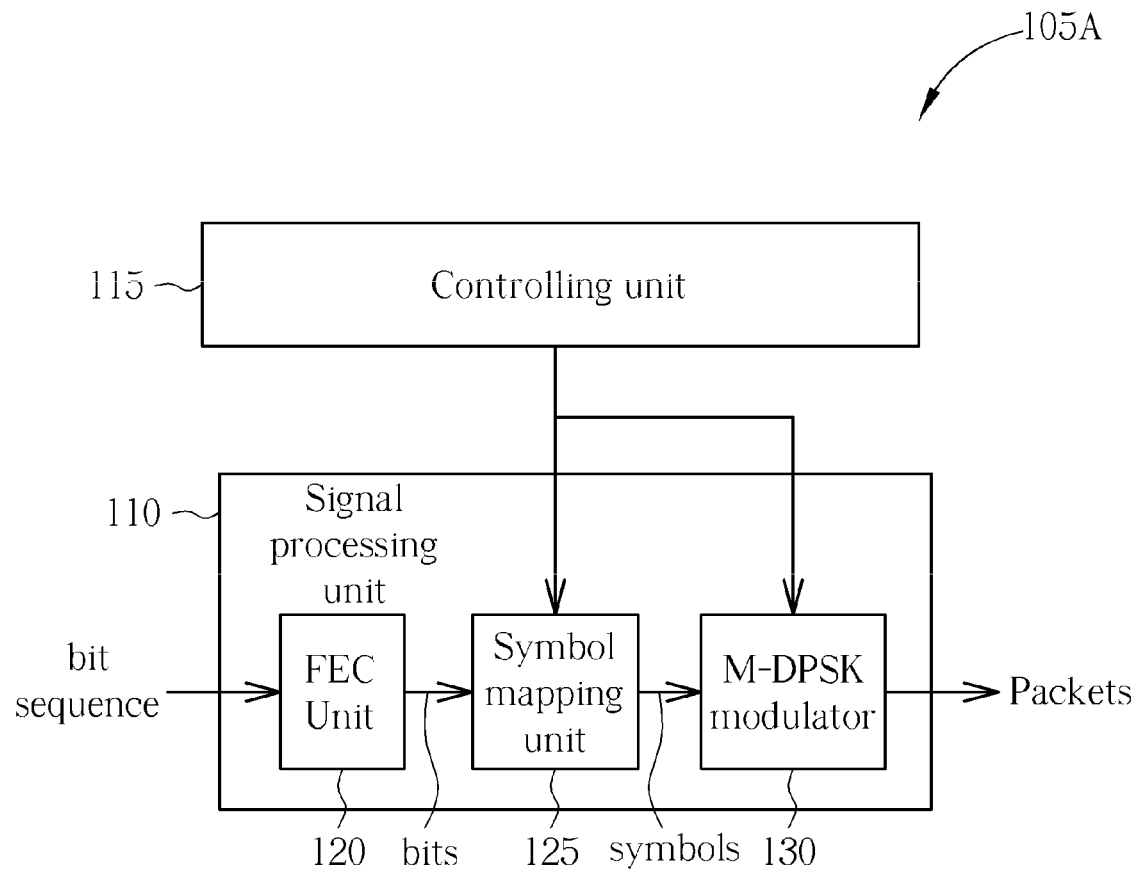
FIG. 3 is a diagram of an implementation of the communication device shown in FIG. 1 when the communication device is used as a transmitter of the Bluetooth system.

Please refer to FIG. 3, which illustrates a diagram of an implementation of the communication device 105A shown in FIG. 1 when the communication device 105A is used as a transmitter of the Bluetooth system. As shown in FIG. 3, the signal processing unit 110 comprises a forward error correction (FEC) unit 120, a symbol mapping unit 125, and an M-DPSK modulator 130 where 'M' relates to binary ('B') or quadrature ('Q') at least. The FEC unit 120 receives a bit sequence and is used for adding an error correction code to the bit sequence to generate data content of a payload of a Bluetooth packet for error control of transmission. The symbol mapping unit 125 receives the data content of the payload and is utilized for converting the data content into symbols, and the symbols is then received and processed by the M-DPSK modulator 130. In one embodiment, if the communication device 105A transmits voice packets, then the controlling unit 115 commands the symbol mapping unit 125 to convert the bit sequence into symbols consisting of '0' and '1', and commands the M-DPSK modulator 130 to perform BDPSK modulation according to the symbols for voice transmission. If the communication device 105A transmits data packets, then the controlling unit 115 commands the symbol mapping unit 125 to convert the bit sequence into symbols consisting of '00', '01', '10', and '11', and commands the M-DPSK modulator 130 to perform QDPSK (Quadrature Differential Phase-Shift Keying) modulation according to the symbols for data transmission, so as to gain higher data rate. Since the GFSK modulation is replaced by the BDPSK modulation for audio packet transmission, the transmission performance is enhanced significantly. In another embodiment, the BDPSK modulation is accomplished by reusing the DQPSK modulation in order to save hardware area and cost. In this situation, the symbol mapping unit 125 converts the bit sequence into symbols consisting of '00' and '11', and commands the M-DPSK modulator 130 to perform QDPSK modulation according to the symbols for voice transmission.

Additionally, in practice, the operation of the controlling unit 115 may be associated with a software algorithm. That is, the software algorithm may be used to assist the controlling unit 115 in determining whether the peer communication device 105B provides the symbol mapping function. This also fails within the scope of the present invention.

Please be noted that a GFSK modulator scheme is omitted in FIG. 3 for brevity. The controlling unit 115 adaptively controls the switching between these modulation schemes for optimizing the performance. Therefore, the communication device 105A is still compatible to support the first communication protocol (that is, GFSK modulation in this embodiment).

Figure 4:
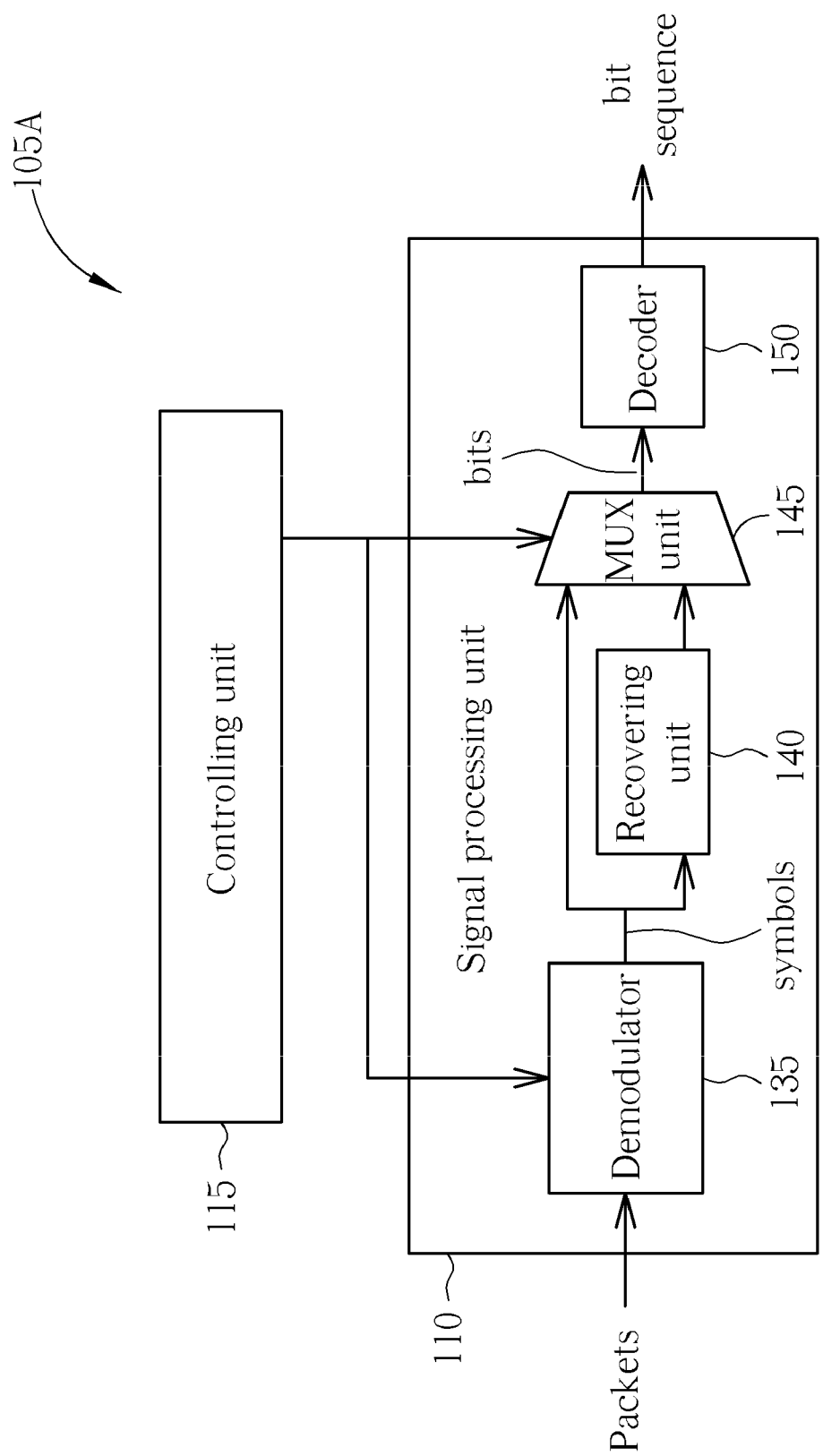
FIG. 4 is a diagram of an implementation of the communication device shown in FIG. 1 when the communication device is used as a receiver of the Bluetooth system.

Please refer to FIG. 4, which illustrates a diagram of an implementation of the communication device 105A shown in FIG. 1 when the communication device 105A is used as a receiver of the Bluetooth system. As shown in FIG. 4, the signal processing unit 110 comprises a demodulator 135, a recovering unit 140, a multiplexer (MUX) unit 145, and a decoder 150. If the communication device 105A receives BDPSK packets, then the controlling unit 115 commands the demodulator 135 to demodulate incoming signals based on the BDPSK demodulation for generating symbols consisting of '0' and '1'. The generated symbols are transmitted to the recovering unit 140 and one input terminal of the MUX unit 145. The recovering unit 140 is utilized for converting the received symbols into a data stream, i.e. a bit sequence. The decoder 150 then decodes the bit sequence outputted by the MUX unit 145, to obtain the data content of the received voice packets. On the other hand, if the communication device 105A receives DQPSK packets, then the controlling unit 115 commands the demodulator 135 to demodulate incoming signals based on the QDPSK demodulation for generating symbols consisting of '00', '01', '10', and '11'. The generated symbols are transmitted to the recovering unit 140 and one input terminal of the MUX unit 145. The recovering unit 140 converts the received symbols into a data stream consisting of bits '0' and '1', i.e. a bit sequence. At this moment, the controlling unit 115 commands the MUX unit 145 to select the output signal of the recovering unit 140 as the output signal of the MUX unit 145. Therefore, the decoder 150 can obtain correct data content of the received data packets by decoding the bit sequence outputted by the MUX unit 145. This receiver structure is also compatible to receive incoming signals modulated by GFSK modulation. The controlling unit 115 commands the demodulator 135 to demodulate the incoming signals based on GFSK demodulation scheme, and controls the MUX unit 145 to select the output of the demodulator 135 rather than the recovering unit 140 as an output signal of the MUX unit 145. The decoder 150 then decodes the bit sequence outputted by the MUX unit 145, to obtain the data content.

Figure 5A:
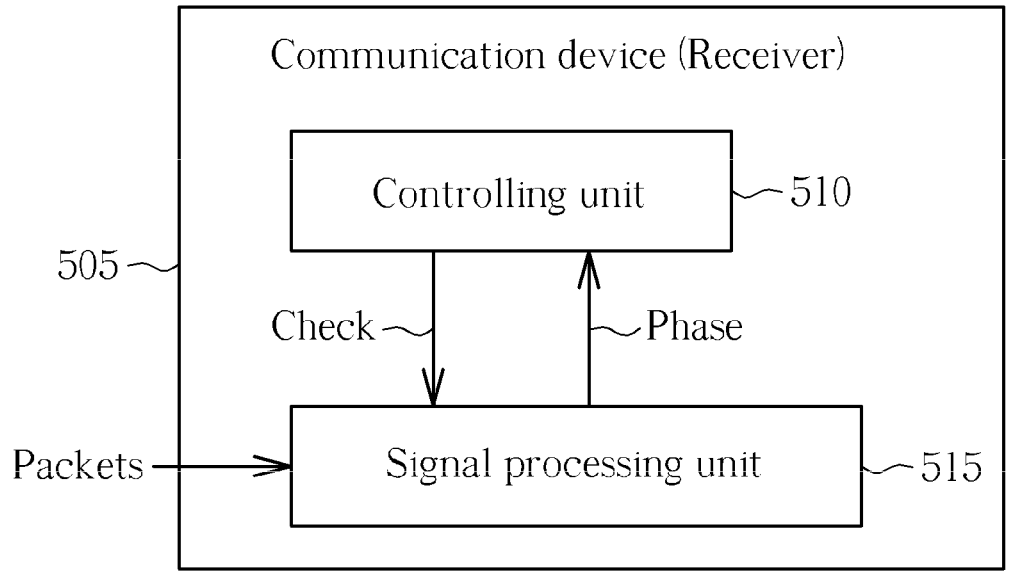
FIG. 5A is a diagram of a communication device according to a second embodiment of the present invention.
Figure 5B:
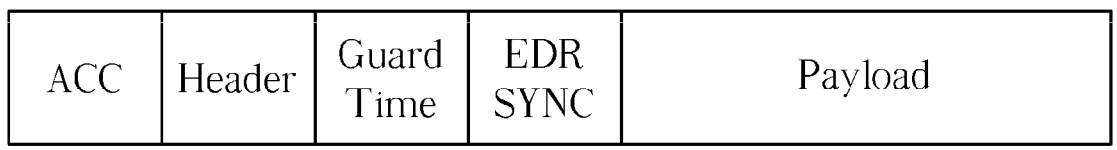
FIG. 5B is a diagram illustrating a packet format of the Bluetooth communication system.

Please refer to FIG. 5A in conjunction with FIG. 5B. FIG. 5A illustrates a diagram of a communication device 505 according to a second embodiment of the present invention. FIG. 5B is a diagram illustrating a packet format of the Bluetooth communication system. As shown in FIG. 5A, the communication device 505 is used as a receiver employed in the Bluetooth communication system, and comprises a signal processing unit 510 and a controlling unit 515. The signal processing unit 510 is utilized for receiving Bluetooth packet(s) from a transmitter of the Bluetooth communication system. The controlling unit 515 is arranged to check if the communication device 505 and the peer transmitter belong to (or correspond to) the same vendor/manufacturer or not; the determination operation of vendor/manufacturer information is similar to the operation of the controlling unit 115 shown in FIG. 1. Once the communication device 505 and the peer transmitter belong to the same vendor/manufacturer, the controlling unit 515 can obtain absolute phase reference information and command the signal processing unit 510 to perform a coherent signal reception by referring to the absolute phase reference information. This is because that a Bluetooth packet of the Bluetooth communication system may carry differential phase reference information. As shown in FIG. 5B, the Bluetooth packet format associated with data transmission may comprise a field 'ACC', a field 'Header', a field 'Guard Time', a field 'EDR SYNC', and a payload body. The field 'ACC' means an access code, the field 'Guard Time' means a guard time interval. Particularly, the field 'EDR SYNC' is arranged to carry the differential phase reference information mentioned above. That is, the field 'EDR SYNC' is designed for differential phase detection. In addition, since the vendor/manufacturer do not easily modify the initial phase of the differential phase modulation/demodulation when providing the same or similar products, the controlling unit 515 can obtain the initial phase information unquestionably if the communication device 505 and the peer transmitter belong to or correspond to the same vendor/manufacturer. Therefore, by obtaining the initial phase information and the differential phase reference information, the controlling unit 515 can acquire the absolute phase reference information. The communication device 505 unquestioningly is capable of coherent signal reception.

Figure 6:
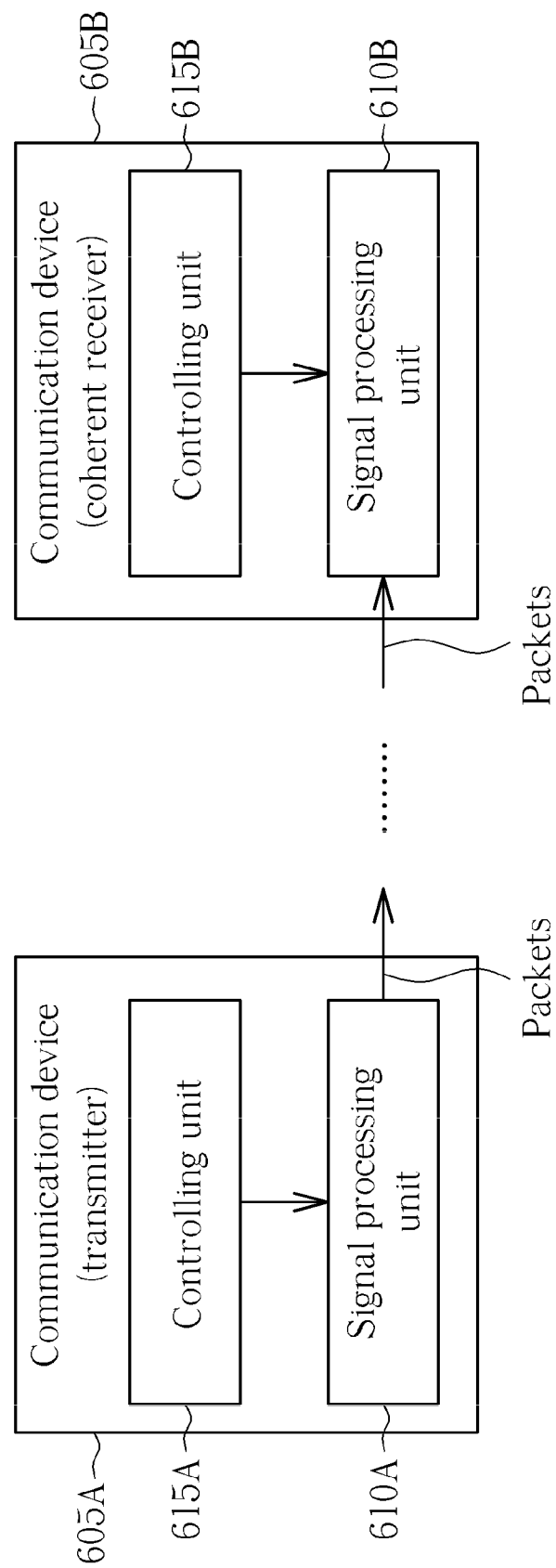
FIG. 6 is a diagram illustrating two communication devices according to a third embodiment of the present invention.

In other embodiments of the present invention, even though the initial phase information may not be obtained, a communication device of the present invention is still capable of coherent signal reception or improved-phase detecting reception merely by a pilot signal pattern. Please refer to FIG. 6. FIG. 6 is a diagram illustrating two communication devices 605A and 605B according to a third embodiment of the present invention. The communication device 605A is used as a transmitter of the Bluetooth communication system, and the communication device 605B is used as a coherent receiver of the Bluetooth communication system. The communication device 605A comprises a signal processing unit 610A and a controlling unit 615A, wherein the signal processing unit 610A is utilized for transmitting a Bluetooth packet and the controlling unit 615A is arranged to command the signal processing unit 610A to insert at least a pilot signal pattern, including absolute phase reference information for phase synchronization, into the Bluetooth packet before the Bluetooth packet is transmitted. The communication device 605B comprises a signal processing unit 610B and a controlling unit 615B. The signal processing unit 610B is used for receiving the Bluetooth packet including the pilot signal pattern inserted by communication device 605A, and is ready to acquire the inserted pilot signal pattern. Therefore, the controlling unit 615B can command the signal processing unit 610B to perform coherent signal reception or improved-phase detecting reception by referring to the absolute phase reference information.

Figure 7A:
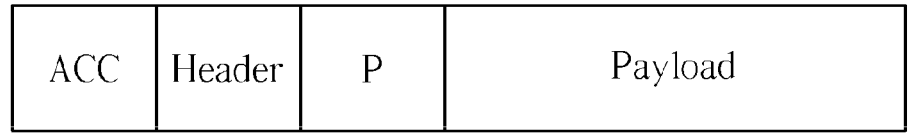
FIG. 7A-FIG. 7D are diagrams respectively illustrating different packet formats utilized by the communication devices shown in FIG. 6 for data or audio transmission.
Figure 7B:
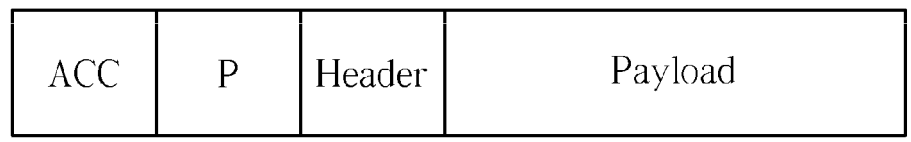
Figure 7C:
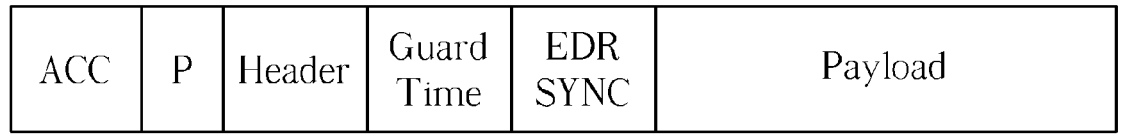
Figure 7D:
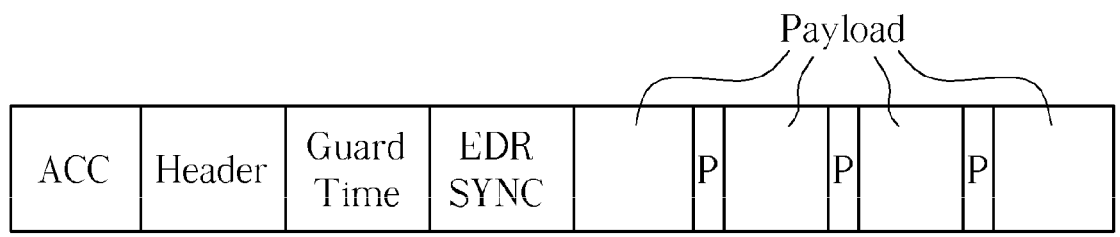

Please refer to FIG. 7A-FIG. 7D. FIG. 7A-FIG. 7D respectively illustrate four different packet formats utilized by the communication devices 605A and 605B for data or audio transmission. As shown in FIG. 7A, the packet format comprises an access code ('ACC'), a header ('Header'), a pilot signal pattern ('P'), and a payload data ('Payload'). The pilot signal pattern ('P') is inserted between the header ('Header') and the payload data ('Payload') by the communication device 605A. As shown in FIG. 7B, the pilot signal pattern ('P') is inserted between the access code ('ACC') and the header ('Header'). Accordingly, by extracting the pilot signal pattern ('P') from the received Bluetooth packet and referring to the extracted pilot signal pattern, the communication device 605B can obtain absolute phase reference information to perform coherent reception. Additionally, as shown in FIG. 7C, the packet format of the Bluetooth packet further comprises a guard time interval ('Guard Time') and an extended data rate synchronization pattern ('EDR SYNC'). The pilot signal pattern ('P') is inserted between the access code ('ACC') and the header ('Header') by the communication device 605A, and then the Bluetooth packet is transmitted from the communication device 605A to the communication device 605B. As a result, by extracting the pilot signal pattern ('P') from the received Bluetooth packet and referring to the extracted pilot signal pattern, the communication device 605B can obtain absolute phase reference information to perform coherent reception. Furthermore, as shown in FIG. 7D, a plurality of pilot signal patterns ('P') are inserted into different predetermined positions respectively placed within the payload data ('Payload') by the communication device 605A. All the predetermined positions are known to both the communication devices 605A and 605B. Therefore, the communication device 605B can correctly extract the pilot signal patterns ('P') from the received Bluetooth packet, and is able to obtain absolute phase reference information for coherent reception by referring to the extracted pilot signal pattern. Multiple pilot signal patterns can enhance the performance of the coherent reception.

In addition, in above-mentioned embodiments, when the communication devices 105A and 105B or 605A and 605B are corresponding to the same vendor/manufacturer, the communication devices 105A and 105B or 605A and 605B can negotiate to employ another higher order modulation/demodulation scheme together in order to improve transmission data rate of the Bluetooth communication system. For example, the higher order modulation/demodulation scheme can be a 16-QAM or 64-QAM modulation/demodulation scheme. Moreover, when the communication devices 105A and 105B or 605A and 605B are provided by the same vendor/manufacturer, the communication devices 105A and 105B or 605A and 605B can negotiate to employ a second coding scheme to replace a first coding scheme so that one of the communication devices 105A and 105B or one of the communication devices 605A and 605B can communicate with the other one by using the second coding scheme to protect payload data. In addition, even though two communication devices are not provided by the same vendor/manufacturer, both the communication devices can also use the second coding scheme different from the original first coding scheme to protect payload data when both the communication devices are configured to support the second communication protocol. The second coding scheme can improve the performance of the Bluetooth communication system. For example, the second coding scheme can be a channel coding scheme including the low-density parity-check (LDPC) code scheme, the block code scheme, the turbo code scheme, and so on.

The communication devices 105A and 105B or 605A and 605B may be mobile devices, such as mobile phone, headset, PDA, laptop, personal computer, etc. The wireless communication system 100 may be but not limited to a short-range communication system including a Bluetooth system or a Near Field Communication (NFC) system, or a communication system applying in the industrial, scientific and medical (ISM) frequency bands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method employed in a bluetooth system including a first bluetooth device and a second bluetooth device, comprising:
setting up a connection between the first and second bluetooth devices;
after the connection is set up, checking vendor information or version information of both the first and second bluetooth devices and outputting a result; wherein the checking step comprises:
determining if contents of a plurality of fields respectively corresponding to link management protocol layers of the first and second bluetooth devices are identical or not, wherein the fields are associated with the vendor information or version information; and
when the contents of the fields are identical, determining that both the first and second bluetooth devices provide a symbol mapping function for converting a first modulation/demodulation to a second modulation/demodulation different from the first modulation/demodulation;
determining whether to use a second modulation/demodulation based on the result; and
when the result indicates using the second modulation/demodulation, using the second modulation/demodulation to replace a first modulation/demodulation so that each of the first and second bluetooth devices communicates with each other by using the second modulation/demodulation.

2. The communication method of claim 1, wherein the first modulation/demodulation is a Gaussian Frequency-Shift Keying (GFSK) modulation/demodulation, and the second modulation/demodulation is an M-ary Differential Phase-Shift Keying (MDPSK) modulation/demodulation or an M-ary Quadrature Amplitude Modulation (MQAM).

3. The communication method of claim 1, wherein an order of the second modulation/demodulation is substantially higher than an order of the first modulation/demodulation.

4. A communication method employed in a receiver of a Bluetooth communication system, comprising:
receiving a Bluetooth packet, including differential phase reference information, from a transmitter;
checking vendor information or version information of both the transmitter and receiver and outputting a result, wherein the checking step comprises:
determining if contents of a plurality of fields respectively corresponding to link management protocol layers of the first and second bluetooth devices are identical or not, wherein the fields are associated with the vendor information or version information; and when the contents of the fields are identical, determining that both the first and second bluetooth devices provide a symbol mapping function for converting a first modulation/demodulation to a second modulation/demodulation different from the first modulation/demodulation;

determining whether to perform a coherent signal reception based on the result; obtaining absolute phase reference information according to the differential phase reference information, when the receiver and the transmitter belong to a same vendor; and performing a coherent signal reception by referring to the absolute phase reference information.

5. A communication method employed in a Bluetooth communication system, comprising:

inserting at least a pilot signal pattern, including absolute phase reference information for phase synchronization, into a Bluetooth packet; and transmitting the Bluetooth packet;

wherein the Bluetooth packet is received by a receiver which is utilized for checking vendor information or version information of both the transmitter and receiver and outputting a result, determining whether to perform a coherent signal reception based on the result, obtaining the absolute phase reference information from the pilot signal pattern when the receiver and the transmitter belong to a same vendor, and performing a coherent signal reception by referring to the absolute phase reference information, wherein the checking step comprises:

determining if contents of a plurality of fields respectively corresponding to link management protocol layers of the first and second bluetooth devices are identical or not, wherein the fields are associated with the vendor information or version information; and when the contents of the fields are identical, determining that both the first and second bluetooth devices provide a symbol mapping function for converting a first modulation/demodulation to a second modulation/demodulation different from the first modulation/demodulation.

6. A communication method employed in a Bluetooth communication system, comprising:

receiving a Bluetooth packet, including at least a pilot signal pattern carrying absolute phase reference information;

checking vendor information or version information of both a transmitter and a receiver and outputting a result, wherein the checking step comprises:

determining if contents of a plurality of fields respectively corresponding to link management protocol layers of the first and second bluetooth devices are identical or not, wherein the fields are associated with the vendor information or version information; and when the contents of the fields are identical, determining that both the first and second bluetooth devices provide a symbol mapping function for converting a first modulation/demodulation to a second modulation/demodulation different from the first modulation/demodulation;

determining whether to perform a coherent signal reception based on the result;

obtaining the absolute phase reference information from the pilot signal pattern when the receiver and the transmitter belong to a same vendor; and performing a coherent signal reception by referring to the absolute phase reference information.

7. A first communication device employed in a wireless communication system for communicating with a second communication device, comprising:

a signal processing unit, for processing data content of a packet according to at least a first communication protocol or a second communication protocol different from the first communication protocol; and a controlling unit, coupled to the signal processing unit, for checking if the second communication device supports the second communication protocol after a connection between the first and second communication devices is set up;

wherein the controlling unit checks vendor information or version information of both the first and second communication devices and outputs a result and determines whether to support the second communication protocol based on the result; and, when the second communication device supports the second communication protocol, the controlling unit is utilized for commanding the signal processing unit to process the data content of the packet to be communicated with the second communication device by using the second communication protocol;

wherein the controlling unit is arranged to determine if contents of a plurality of fields respectively corresponding to link management protocol layers of the first and second communication devices are identical or not where the fields are associated with the vendor information or version information; and when the contents of the fields are identical, the controlling unit determines that the second communication device supports the second communication protocol.

8. The first communication device of claim 7, wherein the first communication protocol is a standard communication protocol of the wireless communication system defining a first modulation/demodulation scheme, a first coding/decoding scheme or a first packet format, and the second communication protocol is a non-standard communication protocol of the wireless communication system defining a second modulation/demodulation scheme different from the first modulation/demodulation scheme, a second coding/decoding scheme different from the first coding/decoding scheme or a second packet format different from the first packet format.

9. The first communication device of claim 8, wherein the first modulation/demodulation scheme is a Gaussian Frequency-Shift Keying (GFSK) modulation/demodulation, and the second modulation/demodulation scheme is an M-ary Differential Phase-Shift Keying (MDPSK) modulation/demodulation or an M-ary Quadrature Amplitude Modulation (MQAM).

10. The first communication device of claim 7, wherein the wireless communication system is a short-range communication system comprising a Bluetooth system or a Near Field Communication (NFC) system.

11. The first communication device of claim 7, wherein the wireless communication system applies in industrial, scientific and medical (ISM) frequency bands.

12. The first communication device of claim 7, wherein when the second communication device supports the second communication protocol, the controlling unit commands the signal processing unit to use a second coding scheme defined by the second communication protocol to replace a first coding scheme defined by the first communication protocol so that the first communication device communicates with the second communication device by using the second coding scheme to protect payload data, wherein the second coding scheme is different from the first coding scheme.

13. A communication method employed in a wireless communication system including a first communication device and a second communication device, comprising:
   setting up a connection between the first and second communication devices by using a first communication protocol;
   after the connection is set up, checking if both the first and second communication devices support a second communication protocol different from the first communication protocol, the checking step comprises:
   checking vendor information or version information of both the first and second communication devices and outputting a result; and
   determining whether to support the second communication protocol based on the result; and
   when both the first and second communication devices support the second communication protocol, using the second communication protocol to communicate between the first and second communication devices;
   wherein the first communication protocol is a standard communication protocol of the wireless communication system defining a first modulation/demodulation scheme, a first coding/decoding scheme or a first packet format, and the second communication protocol is a non-standard communication protocol of the wireless communication system defining a second modulation/demodulation scheme different from the first modulation/demodulation 10 scheme, a second coding/decoding scheme different from the first coding/decoding scheme or a second packet format different from the first packet format.

14. The communication method of claim 13, wherein the second coding/decoding scheme is a channel coding/decoding scheme comprising Low density parity check (LDPC) coding, block coding and turbo coding.

15. The communication method of claim 13, wherein the second packet format is different from the first packet format by inserting at least one pilot field into the first packet format.

16. The communication method of claim 13, wherein the wireless communication system is a short-range communication system comprising a Bluetooth system or a Near Field Communication (NFC) system.

17. The communication method of claim 13, wherein the wireless communication system applies in industrial, scientific and medical (ISM) frequency bands.

* * * * *